United States Patent [19]

Fehling

[11] 4,303,278
[45] Dec. 1, 1981

[54] ELASTIC BASE PLATE FOR TRACK CHAINS OF TRACK CHAIN TYPE VEHICLES

[75] Inventor: Hermann Fehling, Beverstedt, Fed. Rep. of Germany

[73] Assignee: Hermann Fehling Tief-und Kulturbau, Beverstedt, Fed. Rep. of Germany

[21] Appl. No.: 118,872

[22] Filed: Feb. 6, 1980

[51] Int. Cl.$^3$ ............................................. B62D 55/28
[52] U.S. Cl. ..................................... 305/35 R; 305/39
[58] Field of Search ................. 305/35 R, 35 EB, 39, 305/46, 51, 53, 54, 55; 152/176, 185.1, 188; 301/44 A

[56] References Cited

U.S. PATENT DOCUMENTS

| 2,686,697 | 8/1954 | Baker | 305/55 X |
| 3,542,439 | 11/1970 | Joos | 305/51 X |

FOREIGN PATENT DOCUMENTS

| 1034049 | 7/1958 | Fed. Rep. of Germany | 305/35 R |
| 2035873 | 1/1972 | Fed. Rep. of Germany | 305/54 |
| 2307634 | 8/1974 | Fed. Rep. of Germany | 305/55 |
| 2607981 | 9/1977 | Fed. Rep. of Germany | 305/35 R |

Primary Examiner—David A. Scherbel

Attorney, Agent, or Firm—Merriam, Marshall & Bicknell

[57] ABSTRACT

Base plate of track chains of track chain type vehicles for the use on less favorable load supporting ground conditions, said base plate being connectable by means of screw bolts or the like with the chain brackets of the track chain; with a counter support for receiving the screw bolts or the like and with an elongated plate-type synthetic body, the lugs of which, arranged on both sides of the counter support, seen in the longitudinal direction of the plate, are chamfered starting from the sole surface of the base plate located in the area of the counter support, in the direction of the chain brackets; whereby the synthetic molded body and the counter support are designed as a one-piece base plate which substantially completely consist of rubber elastic webbed polyurethane; the area of the counter support of the base plate has a rectangular or almost rectangular cross section and is designed massively and the two lugs, in the direction of the chain brackets, are designed bendably; and the base plate has at least one insert elongated in the longitudinal direction of the plate, said insert being of flexible material the bending module of which is substantially greater than that of the rubber elastic webbed polyurethane.

9 Claims, 5 Drawing Figures

ELASTIC BASE PLATE FOR TRACK CHAINS OF TRACK CHAIN TYPE VEHICLES

The invention deals with a base plate of track chains of track chain type vehicles for use under less favorable ground supporting conditions, which are connected to the chain brackets of the track chain by means of screw bolts or the like, with a counter support for receiving the screw bolts or the like, and an elongated plate-type synthetic molded body, the lugs of which are arranged on both sides of the counter support in the longitudinal direction of the plate, said lugs being chamfered from the sole surface of the base plate located in the area of the counter support, in the direction of the chain brackets wherein the synthetic molded body and the counter support are designed as a one-piece base plate which substantially consists of a rubber elastic webbed polyurethane, the area of the counter support of the base plate having a rectangular or an almost rectangular cross-section and being designed massively, and the two lugs being designed bendably in the direction of the chain bracket.

A base plate of this type has already become known through DE-AS No. 21 05 482, said base plate being used for adapting track chain type vehicles, as bulldozers or loading machines as well as hydraulic excavators or similar types, on tracked vehicles for driving over less favorable load supporting conditions, in particular, marshy ground. In the known base plate, the counter support consisting of metal, forms the actual tread as long as the track chain type vehicle is moved on hard ground, e.g., on the street. As soon as the track chain type vehicle is used on marshy ground or the like, the machine weight is distributed over a larger support area which is formed by the lateral synthetic lugs of the counter support. The synthetic lugs in the known base plate have the purpose of decreasing the total weight of the plate which otherwise, in particular, when it is made of metal, would be very large, because of the desired large piece area. Besides, the known base plate, because of the lugs are designed as synthetic molded bodies, is not only to be light, but also is to be suited to withstand field stress such as bending and torsion. In the known base plate it has been known to be of disadvantage, when the track chain type vehicle is driven over hard surfaces, e.g., a street or a sidewalk, damages to the bed then occur by the metal counter support which, in this case, is the only tread. In addition, the counter support wears out easily. Another disadvantage consists in the noise generation and in that powerful vibrations are transmitted onto the drive mechanism of the track chain type vehicle. Finally it has become evident that the synthetic lugs, when driving over obstacles, in particular, curbstone rims, do not yield sufficiently elastically upwardly, in particular, not at very low temperatures, the result being damaged base plates, as well as, in particular, impaired maneuverability of the machine.

Base plates consisting of one-piece synthetic material of a different shape have been suggested, however, there too, the lugs do not have the desired elastic resiliency, in particular, not at very low temperatures. This is due, on the one hand, to the shaping and the inner design of the synthetic molded body, and on the other hand, to the synthetic material used, a polyamide, the wear and elasticity characteristics of which are not sufficient at low temperatures for the purpose in question.

The DE-PS No. 26 07 981 deals with a base plate of the above-mentioned type which is fracture and abrasion resistant, adjusts to every ground unevenness and bestows a high maneuverability to the track chain type vehicle on less favorable load supporting ground conditions, in particular, on marshy ground; and on reinforced hard surfaces neither causes damages to the bed, nor loud drive noises or shock transmissions onto the drive mechanism; whereby the above characteristics are given at exterior and ground temperatures down to $-40°$ C. by using rubber elastic webbed polyurethane. However, difficulties may arise when, due to the low bending resistance of the polyurethane in low load supporting terrain, an excessive sagging of the base plate occurs whereby the area, on which the weight of the vehicle is to be distributed, is reduced.

Thus the invention under discussion has the task to further develop the design of the base plate of the DE-PS No. 26 07 981 so that the advantages of the base plate described therein are retained and an increased bending elasticity is achieved.

This task is solved according to the invention in that the base plate has, at least in one longitudinal direction of the plate, an elongated insert of bendable elastic material, the bending module of which is substantially bigger than that of the rubber elastic webbed polyurethane.

Due to the increased bending module, the hollow chamber system according to DE-PS No. 26 07 981 is no longer necessary, the base plates according to the invention now have in each lug a continuous flat hollow chamber or have an entirely flat surface on the side towards the track chain.

A particularly preferred embodiment consists in that the only "insert" of spring steel is inserted into the base plate in such a manner that said insert can extend over the entire cross section parallel to the ground surface, whereby then the borings receiving the screw bolts are bored through the spring steel insert. Several spring layers may also be provided which are so designed that they are of different lengths in order to make possible the adaptation to the chamfering of the base plate.

In another preferred embodiment the insert/s is/are of slat-type design whereby it is not necessary to bore through the same and whereby the insert/s preferably can consist of fiber glass material. When there are several slat-type inserts parallel to the ground surface, which are arranged on top of one another, again fiber glass rods of varying lengths are used in order to make the application to the chamfering of the base plate possible.

Further characteristics and advantages of the invention become evident from the following description in which the embodiments are individually explained with the aid of schematic drawings, where:

Figure 1:
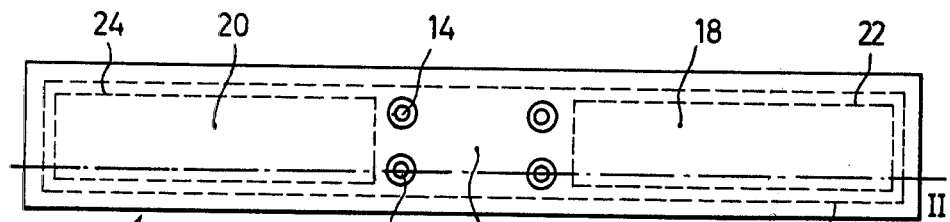
FIG. 1 is an example of the embodiment of a base plate according to the invention seen from the top from the area facing the chain brackets.

As shown in FIG. 1, a base plate, designated as a whole by 10, which is made substantially of rubber elastic webbed tough polyurethane, as it is offered by Farbenfabriken Bayer AG and the firm AKLA Werke AG, has a counter support 12 in which four bores 14 are provided for receiving the screw bolts or the like, by means of which the base plate can be attached to the chain brackets of the track chain. At the sole surface of the base plate 10, the counter support 12, which consists massively of the synthetic mass with inserts, has recesses 16 in which the heads of the screw bolts or the like can be arranged so that they are sunk, which guarantees that no metal parts touch the bed over which the track chain type vehicle is moved.

On both sides of the counter support area 12 the synthetic molded body 10 has lugs 18, 20, which run from the sole of the base plate laterally to the counter support, obliquely outwardly and upwardly whereby the maneuverability of the track chain type vehicle is improved. Both lugs 18, 20 can have recesses in the sole surface 22 and 24, as shown in FIGS. 1 and 2.

Figure 2:
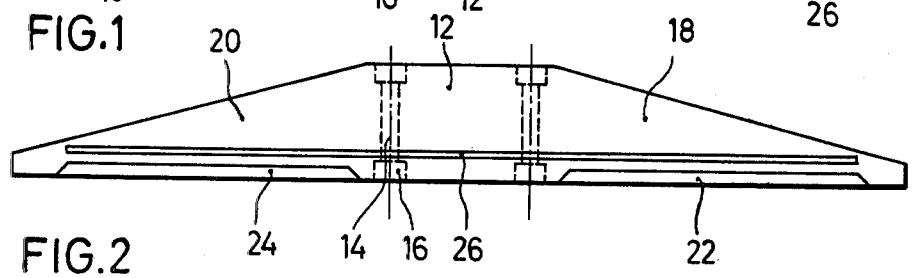
FIG. 2 is a section along line II—II' of FIG. 1.

As illustrated in FIG. 2 and also in FIG. 1, the synthetic molded body has an insert 26 of bendable elastic material which extends over the entire sole surface of the base plate in such a manner that the bores 14 pass through this insert 26.

Figure 3:
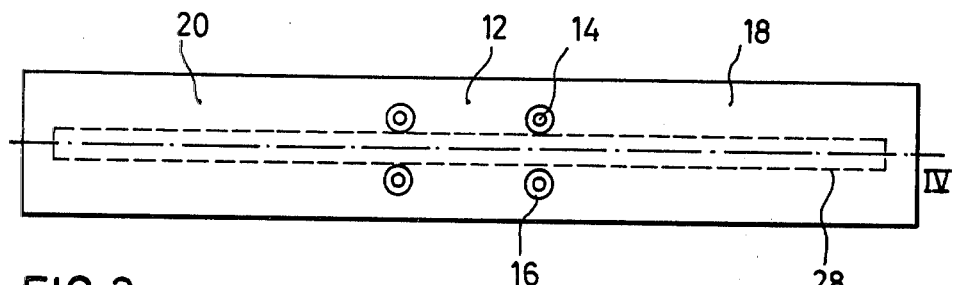
FIG. 3 is another example of the embodiment of a base plate according to the invention in top view, seen from the side facing the chain brackets.
Figure 4:
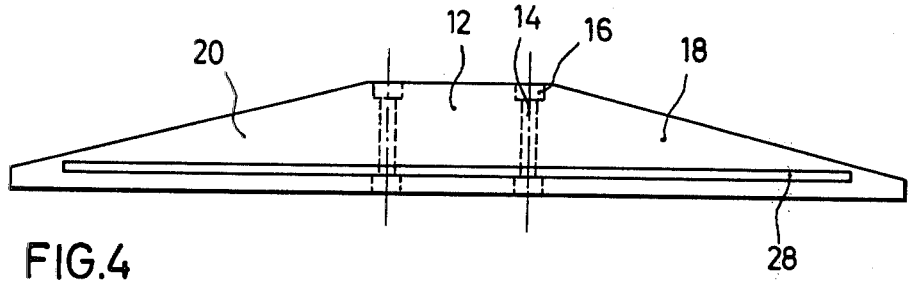
FIG. 4 is an example of the embodiment of FIG. 3, along the line IV—IV'.

FIG. 3 shows another preferred example of the embodiment in which one single slat-type insert 28 preferably manufactured of fiber glass material is arranged towards the bottom area of the synthetic molded body in a manner that, as seen from FIG. 4, a boring through the insert 28 is not necessary.

Figure 5:
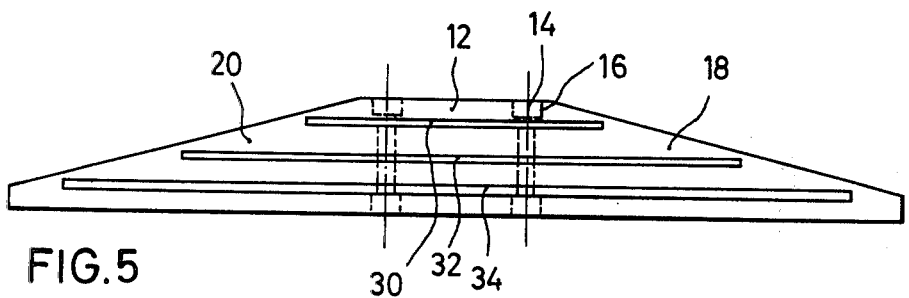
FIG. 5 is another example of the embodiment of the invention, cut along section IV—IV' as stated in FIG. 3.

FIG. 5 shows another preferred example of the embodiment of the base plate according to the invention where several inserts 30, 32, and 34 arranged on top of one another increase the bending module of the base plate. Now the invention will be explained in detail by an example.

The inserts shown in the drawings may be made of carbon fibers.

EXAMPLE

In a particularly preferred embodiment of the invention fiber glass slats of a width of 40 mm and a thickness of 12 mm are so arranged on top of one another that the combined distance amounts to 10 mm at a total thickness of the base plate of 100 mm and a distance of the lower fiber glass slat from the thread of 20 mm and a distance of the upper fiber glass slat from the counter support area of 24 mm.

The characteristics of the invention made known in the above description, in the drawing, and in the claims, can be substantial individually as well as in any combination, for the realization of the invention in its various embodiments.

I claim:

1. A base plate for track chains of a track chain type of vehicle, said base plate being for use on less favorable supporting soil and which is connectable to chain brackets of the track chain by bolts, said base plate comprising an elongated plate-like body having a sole surface and an upper side, a counter support at approximately the center of said body and having bores therethrough for receiving said bolts, lugs arranged on said upper side and extending from both dides of said counter support in the longitudinal direction and being chamfered from said sole surface in the direction of said counter support, said body being a one-piece moulded member comprised substantially completely of a rubber elastic cross-linked polyurethane, said counter support having a generally rectangular cross-section and being designed massively and said two lugs being bendable in the direction of the chain brackets, said base plate further comprising at least one one-piece insert which extends parallel to said sole surface and for substantially the entire length of said sole surface, said insert being made from a bendable elastic material whose bending modulus is significantly higher than that of the rubber elastic cross-linked polyurethane, and said insert being encased by said moulded polyurethane.

2. A base plate according to claim 1, wherein a recess is formed in said sole surface below each of said two lugs.

3. A base plate according to claim 1, wherein said insert is made of spring steel.

4. A base plate according to claim 1, wherein said insert comprises elastic slats that are arranged substantially parallel to said sole surface and are spaced from said bores.

5. A base plate according to claim 4, wherein said slats comprise fiber glass rods.

6. A base plate according to claim 1, wherein said insert is made of fiber glass material.

7. A base plate according to claim 1, wherein a plurality of superimposed inserts of varying lengths are provided in order to permit an adaptation to said chamfer.

8. A base plate according to claim 7, wherein said fiber glass slats have a width of approximately 40 mm and thickness of approximately 12 mm, the reciprocal spacing of the superimposed fiber glass slats being 10 mm in the case of an overall thickness of the base plate of 100 mm and a spacing between the lower fiber glass slats and the tread of 20 mm and a distance between the upper fiber glass slat and the counter support surface of 24 mm.

9. A base plate according to claim 1, wherein said insert is made of carbon fibers.

* * * * *